US012281979B2

United States Patent
Tripathy et al.

(10) Patent No.: US 12,281,979 B2
(45) Date of Patent: Apr. 22, 2025

(54) HIGH-SPEED TUNABLE CHEMICAL COMPOSITION DETECTING COMPONENTS AND APPARATUSES

(71) Applicant: Honeywell International Inc., Charlotte, NC (US)

(72) Inventors: Janmejaya Tripathy, Bangalore (IN); Sumit Kulkarni, Bangalore (IN); Swapnil Patil, Hyderabad (IN); R. Ranjith Narayanan, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 279 days.

(21) Appl. No.: 17/588,495

(22) Filed: Jan. 31, 2022

(65) Prior Publication Data

US 2023/0194417 A1 Jun. 22, 2023

(30) Foreign Application Priority Data

Dec. 17, 2021 (IN) .............................. 202111058919

(51) Int. Cl.
*G02B 27/10* (2006.01)
*G01N 21/3504* (2014.01)
(Continued)

(52) U.S. Cl.
CPC ....... *G01N 21/3504* (2013.01); *G02B 5/1814* (2013.01); *G02B 26/0833* (2013.01); *G02B 27/10* (2013.01); *G01N 2201/068* (2013.01)

(58) Field of Classification Search
CPC ......... G01N 21/3504; G01N 2201/068; G01N 2021/3129; G02B 5/1814; G02B 26/0833;
(Continued)

(56) References Cited

U.S. PATENT DOCUMENTS 6,104,511 A * 8/2000 Hesselink .............. G06K 19/16
365/216
6,567,163 B1 * 5/2003 Sandstrom ......... G01N 21/6428
250/461.1
(Continued)

FOREIGN PATENT DOCUMENTS

JP 5529511 B2 6/2014

OTHER PUBLICATIONS

European search report Mailed on Apr. 4, 2023 for EP Application No. 22207198, 7 page(s).
(Continued)

*Primary Examiner* — Isiaka O Akanbi
(74) *Attorney, Agent, or Firm* — Alston & Bird LLP

(57) ABSTRACT

Methods, apparatuses and systems for detecting multiple gaseous substances for detecting a plurality of target gaseous substances or chemical compositions, using, for example, a high-speed, tunable gas detecting apparatus. An example gas detecting apparatus may comprise: a light source configured to generate a light beam, a moveable mirror component configured to move between a plurality of positions, wherein each position of the moveable mirror component is associated with a narrow band corresponding with a gas absorption frequency range of a target gaseous substance or chemical composition, at least one optical component configured to condition an output light beam of the moveable mirror component, wherein a measurable attenuated optical signal is generated responsive to exposing a sample gaseous substance to the conditioned output light beam.

20 Claims, 8 Drawing Sheets

(51) Int. Cl.
*G02B 5/18* (2006.01)
*G02B 26/08* (2006.01)

(58) Field of Classification Search
CPC ........ G02B 27/10; G01J 3/0208; G01J 3/021; G01J 3/12; G01J 3/18; G01J 3/42
USPC .................. 356/437, 326, 328, 319, 317
See application file for complete search history.

(56) References Cited

U.S. PATENT DOCUMENTS

| | | | | |
|---|---|---|---|---|
| 7,245,376 | B2* | 7/2007 | Liphardt | G01N 21/211 356/369 |
| 9,383,562 | B2* | 7/2016 | Hartell | G02B 21/364 |
| 9,409,255 | B1* | 8/2016 | Martinsen | B23K 26/066 |
| 11,579,459 | B2* | 2/2023 | Kent | G01J 3/021 |
| 2002/0057431 | A1* | 5/2002 | Fateley | G02B 27/1013 356/330 |
| 2003/0048442 | A1* | 3/2003 | Xiao | G01J 3/18 356/333 |
| 2004/0218172 | A1* | 11/2004 | DeVerse | G01N 21/255 250/559.4 |
| 2005/0243312 | A1* | 11/2005 | Geshwind | G01J 3/2846 356/330 |
| 2005/0254709 | A1* | 11/2005 | Geshwind | G06V 10/56 382/182 |
| 2007/0133001 | A1* | 6/2007 | Cox | G01J 3/42 250/357.1 |
| 2007/0183943 | A1* | 8/2007 | Golovkina | B01J 19/0046 422/186.3 |
| 2009/0112482 | A1* | 4/2009 | Sandstrom | G01N 21/6452 702/19 |
| 2012/0262713 | A1* | 10/2012 | Florek | G01J 3/02 356/319 |
| 2013/0182250 | A1* | 7/2013 | McClure | G01J 3/2823 356/302 |
| 2019/0104942 | A1* | 4/2019 | Peru | G01J 3/0264 |
| 2020/0379270 | A1* | 12/2020 | Kent | G01J 3/021 |

OTHER PUBLICATIONS

EP Office Action Mailed on Jun. 7, 2024 for EP Application No. 22207198, 5 page(s).

* cited by examiner

HIGH-SPEED TUNABLE CHEMICAL COMPOSITION DETECTING COMPONENTS AND APPARATUSES

CROSS-REFERENCE TO RELATED APPLICATIONS

This application claims priority to Indian Application No. 202111058919, filed Dec. 17, 2021, the contents of which are hereby incorporated herein in its entirety by reference.

BACKGROUND

Gas detectors may detect and/or measure the concentration level of gaseous substance and/or compounds in a gaseous substance. In general, these gas detectors (e.g., infrared gas detectors) are capable of monitoring only one gaseous substance per unit device. Many gas detectors are plagued by technical challenges and limitations.

BRIEF SUMMARY

Various embodiments described herein relate to methods, apparatuses, and systems for detecting a plurality of gaseous substances, such as, for example, a high-speed, tunable gas detecting apparatus.

In accordance with various examples of the present disclosure, a gas detecting apparatus is provided. The apparatus may comprise: a light source configured to generate a light beam; a moveable mirror component a moveable mirror component configured to move between a plurality of positions, wherein each position of the moveable mirror component is associated with a narrow band corresponding with a gas absorption frequency range of a target gaseous substance or chemical composition; at least one optical component configured to condition an output light beam of the moveable mirror component, wherein a measurable attenuated optical signal is generated responsive to exposing a sample gaseous substance to the conditioned output light beam; and a controller component in electronic communication with the moveable mirror component and the at least one optical component that is configured to determine a concentration level of each of the target gaseous substances or chemical compositions based at least in part on the measurable attenuated optical signal.

In some examples, the controller component is configured to generate a concentration level indication for each of the target gaseous substances or chemical compositions.

In some examples, the moveable mirror component comprises a microelectromechanical (MEMS) mirror, microscanner or high speed rotating mirror component driven by an electrostatic, piezoelectric or electromagnetic actuator.

In some examples, the at least one optical component comprises one or more of telecentric lenses, a beam splitter, and a grating element.

In some examples, the gas detecting apparatus further comprises at least one calibration detector that is configured to selectively filter a particular wavelength of the conditioned light beam.

In some examples, the controller component is further configured to: identify one or more light beam characteristics associated with the selectively filtered wavelength; identify stored parameters associated with the one or more light beam characteristics; and determine whether the one or more light beam characteristics correspond with the stored parameters.

In some examples, the controller component is further configured to: in response to determining that the one or more light beam characteristics do not correspond with the stored parameters, transmit a control indication to generate an alert.

In some examples, the stored parameters comprise a moveable mirror component angle and power.

In some examples, the controller component is configured to determine the concentration level of each of the target gaseous substances or chemical compositions using a trained machine learning model In some examples, the at least one optical component comprises telecentric lenses that is configured to modify an angle of incidence of the light beam.

In accordance with various examples of the present disclosure, a method is provided.

The method may comprise generating, by a light source of a detecting apparatus, a light beam; conditioning, by at least one optical component, an output light beam of a moveable mirror component of the gas detecting apparatus, wherein: the moveable mirror component is configured to move between a plurality of positions, each position of the moveable mirror component is associated with a narrow band corresponding with a gas absorption frequency range of a target gaseous substance or chemical composition, and a measurable attenuated optical signal is generated responsive to exposing a sample gaseous substance to the conditioned output light beam; and determining, by a controller component in electronic communication with the moveable mirror component and the at least one optical component, a concentration level of each of the target gaseous substances or chemical compositions based at least in part on the measurable attenuated optical signal.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
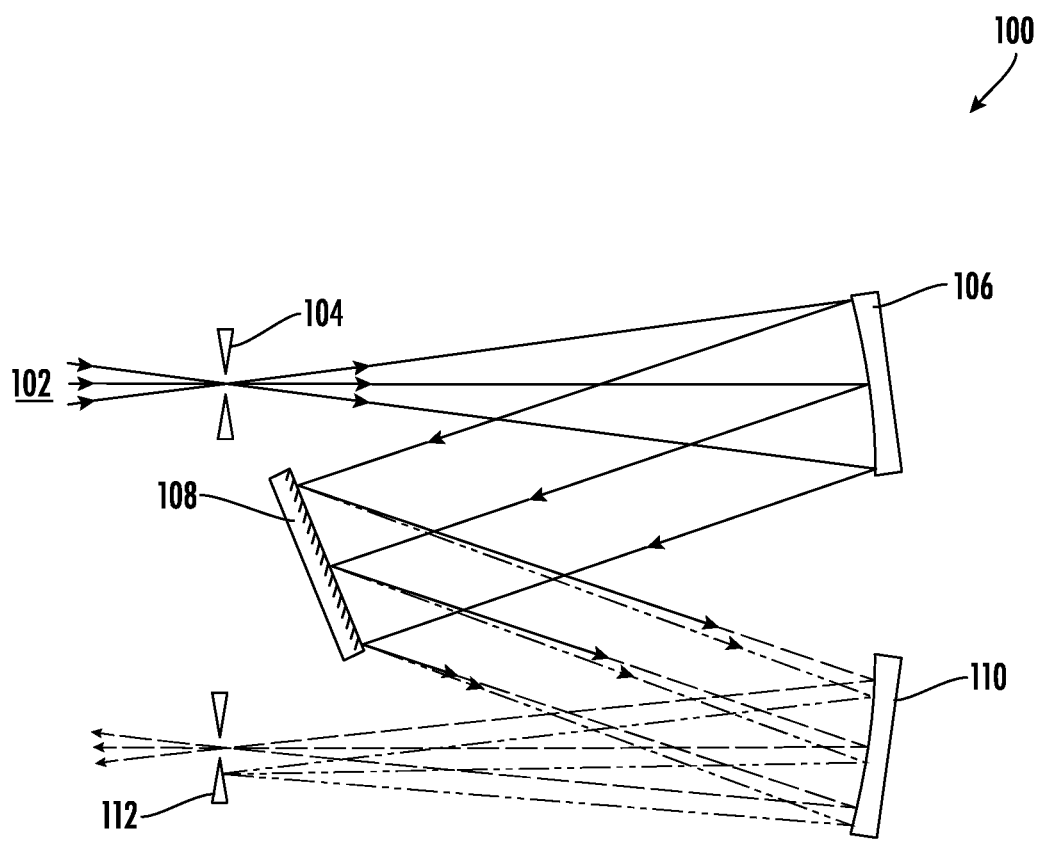
FIG. 1 illustrates an example schematic diagram depicting a conventional monochromator in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements (for example, but not limited to, an example processing circuitry, communication module, input/output module memory) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

Various apparatuses (such as, but not limited to, an infrared gas detector or fixed gas detector) may detect a presence of and/or measure a concentration level of a target gaseous substance, chemical composition, molecules, vapor, and/or the like. For example, optical measurement is based on the tendency of molecules in a gaseous substance, when exposed to certain wavelengths of radiant energy (e.g., infrared light), to absorb the energy and reach higher levels of molecular vibration and rotation. For example, infrared radiation may cause resonance of molecules in a gaseous substance at their natural frequency within a spectrum region where the radiant energy of the infrared radiation is equivalent to the natural frequency of the molecules resulting in energy absorption in the form of molecular vibration. An example infrared gas detector may detect a decrease in transmitted radiant energy (e.g., infrared light) that is proportional to a concentration value/amount of the target gaseous substance. Accordingly, the noted transmittance may be associated with a ratio of transmitted radiation energy (e.g., infrared light) to incident energy resulting in a measurable attenuated optical signal. For instance, a conventional infrared gas detector may comprise an active filter that is configured to select a particular bandwidth for detection of a target gaseous substance. Radiant energy (e.g., infrared light) that does not interact with the target gaseous substance may pass through a reference filter and the difference between the radiant energies of the two bandwidths (i.e., the bandwidth of the active filter and the bandwidth of the reference filter) may correspond with a concentration amount of the target gaseous substance. The relationship between infrared transmittance and a concentration amount of the target gaseous substance can be expressed by the Lambert-Beer formula below:

$$T = \frac{I}{I_0} = e^{-\varepsilon cd}$$

In the above formula:

T is transmittance;

I is the intensity of light passed through a sample gaseous substance and optical filter;

$I_0$ is the initial light intensity emitted from a light source;

$\varepsilon$ is the molar attenuation coefficient;

c is the concentration amount of the sample gaseous substance; and d is the length of the light path.

Using the above formula, the values of $I_0$ and $\varepsilon$ may be preset via calibration of the example infrared gas detector with the values of $\varepsilon$ and d being fixed. Thus, the concentration amount of the sample gaseous substance, c, can be determined by measuring the transmittance, T, within a spectrum region of the absorbed energy/wavelength of the target gaseous substance.

Referring now to FIG. 1, a schematic diagram depicting a conventional gas detecting component 100 (e.g., monochromator) of an example gas detecting apparatus (e.g., a fixed gas detector) in accordance with various embodiments of the present disclosure is provided. As depicted, the gas detecting component 100 may be or comprise a Czerny-Turner configuration including at least a collimating mirror 106, a grating element 108, and a focusing mirror 110. In various examples, the gas detecting component 100 (e.g., monochromator) may operate to provide/condition a light beam in order to facilitate providing measurements associated a target gaseous substance.

As illustrated in FIG. 1, the gas detecting component 100 comprises a light source 102 that generates a light beam which enters the gas detecting component 100 through a first aperture 104 on a surface of the gas detecting component 100. As depicted, the light beam may travel along at least a portion of a path (e.g., channel) of the example gas detecting component 100 to reach a collimating mirror 106. The collimating mirror 106 collimates the light beam and reflects it onto the grating element 108 (e.g., diffraction grating element). Subsequently, the grating element 108 diffracts the collimated light beam onto the focusing mirror 110. In various examples, the focusing mirror 110 operates to focus the conditioned light beam through a second opening 112. As noted above, a measurable attenuated optical signal may be generated in response to exposing a gaseous substance to the conditioned beam of a particular bandwidth. In various examples, a detecting element may be utilized to provide measurements associated with a gaseous substance, for instance, by measuring incident light that is not absorbed by a gaseous substance. In other words, an attenuated optical signal per scanning wavelength band may be recorded by the detecting element with respect to spectral absorbance of the interacting molecules.

Many spatially distributed spectral gas detectors may operate to detect a target gaseous substance utilizing particular narrow band filters. These gas detectors may be prone to various technical problems and challenges. For example, in order for a gas detector (e.g., monochromator) to function optimally, its surfaces should be kept free of dust and/or water vapor. However, as a gaseous substance is conveyed through at least a portion of a gas detector, some of the water vapor may absorb dust particles in ambient air and, in some cases, may deposit the dust particles on various exposed elements (e.g., a collimating mirror). Accordingly, the output light beam generated by these gas detectors may be weakened due to the presence of dust and/or water vapor resulting in reduced sensitivity of the gas detector and/or drift which may affect the accuracy of measurements generated by the gas detector.

In another example, the grating element and/or collimating mirror of an example gas detector (e.g., monochromator) is generally positioned (e.g., tilted and/or mounted at a particular angle) in order to select a probe/target wavelength associated with a target gaseous substance or chemical composition. In many examples, the components (e.g., collimating mirror, diffractive element with rotating stage) of these gas detectors are made from bulky materials which are unsuitable for high frequency tuning to satisfy changing field conditions/detect multiple target gases during operations. Additionally, in many examples, these detectors with moveable mechanical elements operate at very slow rates and are prone to failure in field conditions.

In yet another example, cross-sensitivity of other gaseous substances, chemical composition(s), molecules, vapor, and/or the like to a probe wavelength may result in false alarms being generated by the example gas detector. Accordingly, the example gas detector may not be capable of analyzing and/or identifying cross-sensitive gaseous substances or chemical compositions that are present in a sample substance.

In accordance with various embodiments of the present disclosure, example methods, apparatuses and systems are provided. In some embodiments, a moveable mirror component operates to change an angle of an incident beam on a diffraction grating element through a set of telecentric lenses thereby modifying a wavelength emerging from an aperture of an example gas detecting component/apparatus. Depending on a spectral absorption magnitude of interacting molecules, there may be variation in attenuation in the recorded optical signal in each scanned narrow wavelength band.

An example gas detecting apparatus may comprise a light source configured to generate a light beam, a moveable mirror component, a moveable mirror component configured to move between a plurality of positions, wherein each position of the moveable mirror component is associated with a narrow band corresponding with a gas absorption frequency range of a target gaseous substance or chemical composition; at least one optical component configured to condition an output light beam of the moveable mirror component, wherein a measurable attenuated optical signal is generated responsive to exposing a sample gaseous substance to the conditioned output light beam; and a controller component in electronic communication with the moveable mirror component and the at least one optical component that is configured to determine a concentration level of each of the target gaseous substances or chemical compositions based at least in part on the measurable attenuated optical signal. In some examples, the controller component is configured to generate a concentration level indication for each of the target gaseous substances or chemical compositions. In some examples, the moveable mirror component comprises a microelectromechanical (MEMS) mirror, microscanner or high speed rotating mirror component driven by an electrostatic, piezoelectric or electromagnetic actuator. In some examples, the at least one optical component comprises one or more of telecentric lenses, a beam splitter, and a grating element. In some examples, the gas detecting apparatus further comprises at least one calibration detector that is configured to selectively filter a particular wavelength of the conditioned light beam. In some examples, the controller component is further configured to: identify one or more light beam characteristics associated with the selectively filtered wavelength; identify stored parameters associated with the one or more light beam characteristics; and determine whether the one or more light beam characteristics correspond with the stored parameters. In some examples, the controller component is further configured to: in response to determining that the one or more light beam characteristics do not correspond with the stored parameters, transmit a control indication to generate an alert. In some examples, the stored parameters comprise a moveable mirror component angle and power. In some examples, the controller component is configured to determine the concentration level of each of the target gaseous substances or chemical compositions using a trained machine learning model. In some examples, the at least one optical component comprises telecentric lenses that is configured to modify an angle of incidence of the light beam.

In various embodiments, a method is provided. The method may comprise generating, by a light source of a detecting apparatus, a light beam; conditioning, by at least one optical component, an output light beam of a moveable mirror component of the detecting apparatus, wherein: the moveable mirror component is configured to move between a plurality of positions, each position of the moveable mirror component is associated with a narrow band corresponding with a gas absorption frequency range of a target gaseous substance or chemical composition, and a measurable attenuated optical signal is generated responsive to exposing a sample gaseous substance to the conditioned output light beam; and determining, by a controller component in electronic communication with the moveable mirror component and the at least one optical component, a concentration level of each of the target gaseous substances or chemical compositions based at least in part on the measurable attenuated optical signal. In some examples, the method further comprises generating, by the controller component, a concentration level indication for each of the target gaseous substances or chemical compositions. In some examples, the moveable mirror component comprises a MEMS mirror, microscanner or high speed rotating mirror component driven by an electrostatic, piezoelectric or electromagnetic actuator. In some examples, the at least one optical component comprises one or more of telecentric lenses, a beam splitter, and a grating element. In some examples, the method further comprises selectively filtering, by at least one calibration detector of the detecting apparatus, a particular wavelength of the conditioned light beam. In some examples, the method further comprises identifying, by the controller component, one or more light beam characteristics associated with the selectively filtered wavelength; identifying, by the controller component, stored parameters associated with the one or more light beam characteristics; and determining, by the controller component, whether the one or more light beam characteristics correspond with the stored parameters. In some examples, the method further comprises in response to determining, by the controller component, that the one or more light beam characteristics do not correspond with the stored parameters, transmitting, by the controller component, a control indication to generate an alert. In some examples, the stored parameters comprise a moveable mirror component angle and power. In some examples, the controller component is configured to determine the concentration level of each of the target gaseous substances or chemical compositions using a trained machine learning model. In some examples, the at least one optical component comprises telecentric lenses that are configured to modify an angle of incidence of the light beam.

Figure 2:
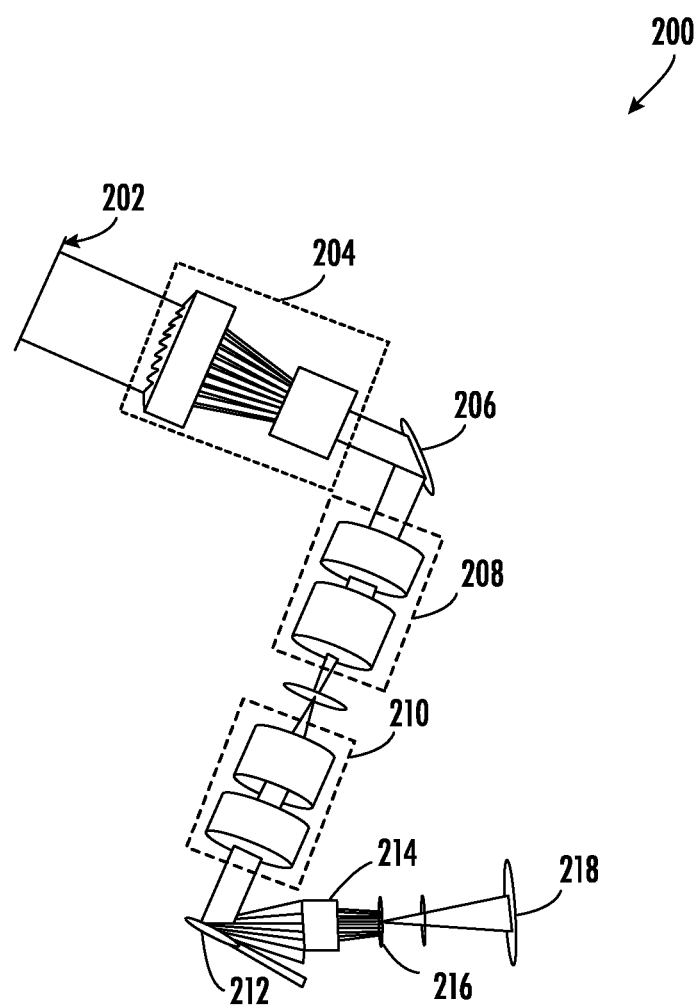
FIG. 2 illustrates an example schematic diagram depicting a gas detecting component in accordance with various embodiments of the present disclosure.

Referring now to FIG. 2, a schematic diagram depicting an example gas detecting component 200 (e.g., multi-gas, high-speed monochromator) in accordance with various embodiments of the present disclosure is provided. The example gas detecting component 200 may be or comprise at least a portion of an example gas detecting apparatus (e.g., fixed gas detecting apparatus) that is configured to provide measurements associated with one or more target gaseous substances, chemical compositions, molecules, and/or the like. Accordingly, it should be understood that in some examples, the gas detecting component 200 may be configured to detect gaseous substances and/or chemical compositions (e.g., without limitation, liquid substances, vapors, transparent solid substances, semi-transparent solid substances, and/or the like). As noted above, in contrast with conventional devices which utilize a grating element that may be mounted on a rotating plane, the example gas detecting component 200 may operate as a high speed monochromator which utilizes changes in the position (e.g., tilt angle) of a moveable mirror component in combination with a lens system (e.g., telecentric lens pair combination) to modify the incident angle of a conditioned light beam on a grating element (e.g., a stationary diffraction grating element).

As illustrated in FIG. 2, the example gas detecting component 200 comprises a light source 202, a beam compressor 204, a moveable mirror component 206, a first lens 208, a second lens 210, a focusing lens 214, a grating element 212, an optical component 216 (e.g., spectral filter), and an observation plane 218. In various examples, the gas detecting component 200 is configured to condition a light beam at a selected wavelength and direct the conditioned light beam to ensure the proper orientation/operation of the moveable mirror component 206 with respect to a detecting element (e.g., as shown, towards observation plane 218) in order to facilitate providing measurements associated with one or more target gaseous substances, chemical compositions, molecules, and/or the like.

As noted above, the example gas detecting component 200 comprises a light source 202 that is configured to emit a light beam (e.g., infrared light) through an aperture/opening (e.g., slit) on a surface of the gas detecting component 200. In various embodiments, the light source 202 may be configured to produce, generate, emit, and/or trigger the production, generation, and/or emission of light beams. The example light source 202 may include, but is not limited to, laser diodes, incandescent based light sources, luminescent based light sources, combustion based light sources, electric arc based light sources, gas discharge based light sources, high-intensity discharge based light sources, light-emitting diodes (LEDs), and/or the like.

As further depicted in FIG. 2, the light beam generated and/or emitted by the light source 202 may travel along at least a portion of a path (e.g., channel) of the example gas detecting component 200 to reach a beam compressor 204. As depicted, the beam compressor 204 is downstream with respect to the light source 202. The term downstream may refer to a location of a first component along a path/channel with respect to a second component along the path/channel, based at least in part on the direction in which light beams travel therethrough. For example, if a light beam travels from component A, and subsequently travels to component B, then component B is downstream with respect to component A. Similarly, the term upstream may refer to a location of a first component along a path/channel with respect to second component along the path/channel, based at least in part on the direction in which light beams travel therethrough. For example, if a light beam travels to component A, and subsequently travels to component B, then component A is upstream with respect to component B. In various examples, the beam compressor 204 is configured to condition, compress and/or direct the light beam generated and/or emitted by the light source 202 as it travels along at least a portion of a path (e.g., channel) within the example gas detecting component 200.

As depicted in FIG. 2, the beam compressor 204 is configured to direct the light beam to travel along at least a portion of the path (e.g., channel) to be incident on the moveable mirror component 206. In some embodiments, a diameter of the light beam emerging from the light source 202 may be larger than a diameter of the moveable mirror component 206. Accordingly, the beam compressor 204 may operate to reduce the diameter of the light beam to be equal to or less than the diameter of the moveable mirror component 206 in order to keep the light beam collimated.

As depicted, the moveable mirror component 206 is downstream with respect to the beam compressor 204. In various examples, the moveable mirror component 206 may be or comprise a microelectromechanical (MEMS) mirror, microscanner, micro scanning mirror, or the like. The moveable mirror component 206 may be a high speed rotating mirror component driven by an electromagnetic, electrostatic or piezoelectric actuator. In some embodiments, the example moveable mirror component 206 may have a diameter between 0.1 millimeters (mm) to 5 mm. In some embodiments, the example moveable mirror component 206 may have a rotational speed between 10 hertz (Hz) and 23 kilohertz (kHz). In some embodiments, the moveable mirror component 206 comprises a reflective surface and/or coating comprising for example without limitation, Aluminum, Gold, Silver, special reflection coating, combinations thereof, and/or the like. In some examples, the moveable mirror component 206 is configured to rotate with respect to one or more axes (e.g., single, dual, or a plurality of degrees of freedom). The example moveable mirror component 206 can be positioned/configured to facilitate modification of a gas absorption frequency range of the example gas detecting apparatus based at least in part on a position of the moveable mirror component 206, as described below in connection with FIG. 4 below. Accordingly, the moveable mirror component 206 may provide sequential transition wavelengths for multi-gas detection and quantification operations. As illustrated in FIG. 2, the moveable mirror component 206 is positioned/configured to direct the light beam directed by the beam compressor 204 as it travels along at least a portion of the path (e.g., channel) within the example gas detecting component 200.

As illustrated in FIG. 2, the moveable mirror component 206 is configured to direct the light beam to be incident on the first lens 208 and the second lens 210. As depicted, the first lens 208 and the second lens 210 are downstream with respect to the moveable mirror component 206. In some embodiments, the first lens 208 and the second lens 210 may each be or comprise transmissive optical devices (e.g., for example optical lenses or prisms). In some embodiments, the first lens 208 may comprise a telecentric lens and the second lens 210 may comprise a reverse telecentric lens (i.e., a dual-telecentric collimator arrangement). In various embodiments, the first lens 208 and the second lens 210 are arranged to further condition (e.g., collimate), focus and/or concentrate a light beam directed by the moveable mirror component 206 as it travels along at least a portion of the path (e.g., channel) within the example gas detecting component 200. In various embodiments, the first lens 208 and the second lens 210 may be arranged/configured to change an angle of an incident collimated light beam entering a first opening (e.g., entrance pupil) in order to focus the emerging light beam at a focal plane height that is proportional to an angle of the light beam at a second opening (e.g., exit pupil). Thus, the first lens 208 and the second lens 210 may be configured to change the angle of incidence of an output beam that is incident on a grating element 212 without changing a position of the output beam/grating element 212.

As further depicted in FIG. 2, in various examples, the first lens 208 and the second lens 210 are positioned/configured to direct the light beam to be incident on a grating element 212. As depicted, the grating element 212 is downstream with respect to the first lens-208 and the second lens 210. The example grating element 212 may be a diffraction grating element that operates to diffract the collimated light beam into a plurality of beams each traveling at different angles. In various embodiments, the diffraction angles of the plurality of beams may be dependent on the incident angle of light to the grating element 212. In various embodiments, the grating element 212 may condition (e.g., diffract) a collimated light beam directed by first lens-208 and the second lens 210 as it travels along at least a portion of the path (e.g., channel) of the example gas detecting component 200.

As shown in FIG. 2, the grating element 212 is configured to direct the light beam to be incident on an optical component 216 (e.g., spectral filter). As depicted, the optical component 216 is downstream with respect to the grating element 212. In various embodiments, the optical component 216 may operate to filter out at least a portion of spectral power associated with certain frequencies/wavelengths (e.g., a target wavelength) of radiation/light thus reducing/eliminating incident optical noise generated by the gas detecting component 200/optical engine. In some examples, the optical component 216 is configured to further condition a light beam directed by the grating element 212 as it travels along at least a portion of the path (e.g., channel) of the example gas detecting component 200.

As depicted in FIG. 2, in various embodiments, the optical component 216 (e.g., spatial filter) is positioned/configured to direct the light beam to be incident on the observation plane 218. As depicted, the observation plane 218 is downstream with respect to the optical component 216. In some embodiments, the observation plane 218 may comprise or be disposed adjacent a detecting element that is configured to obtain measurements with respect to one or more target gaseous substances or chemical compositions. In some embodiments, the observation plane 218 may be or comprise a location (e.g., point, plane, and/or the like) at which an output may be evaluated, inspected and/or further conditioned for detecting and/or analyzing a gaseous substance (e.g., chemical composition, molecules). Additionally, in some embodiments, the observation plane 218 serves as an exit location from which the light beam can exit the gas detecting component 200.

While FIG. 2 provides an example of a gas detecting component 200, it is noted that the scope of the present disclosure is not limited to the example shown in FIG. 2. In some examples, an example gas detecting component 200 may comprise one or more additional and/or alternative elements, and/or may be structured/positioned differently than those illustrated in FIG. 2.

Figure 3:
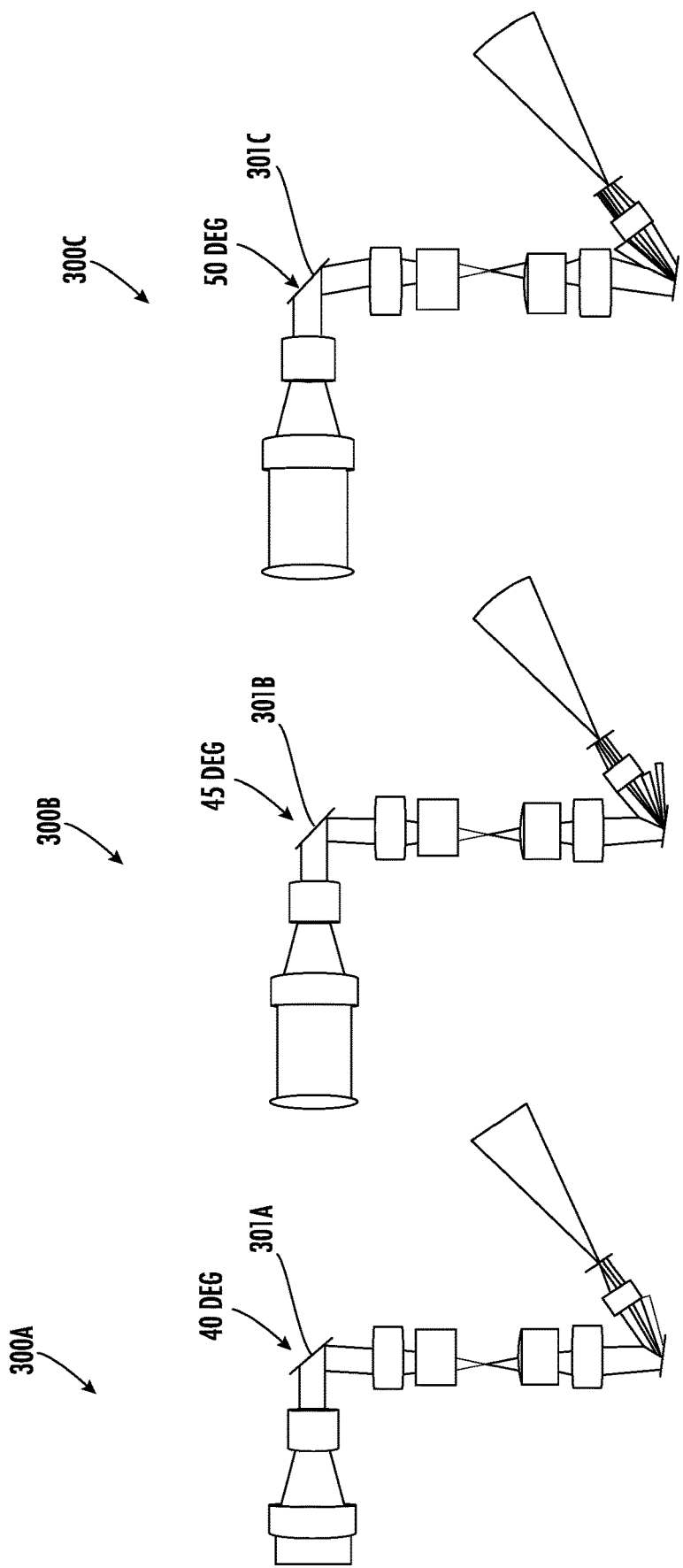
FIG. 3A illustrates an example schematic diagram depicting a gas detecting component in accordance with various embodiments of the present disclosure.
FIG. 3B illustrates an example schematic diagram depicting a gas detecting component in accordance with various embodiments of the present disclosure.
FIG. 3C illustrates an example schematic diagram depicting a gas detecting component in accordance with various embodiments of the present disclosure.

Referring now to FIG. 3A, FIG. 3B and FIG. 3C, schematic diagrams depicting example gas detecting components 300A, 300B and 300C (e.g., high-speed, tunable monochromators) in accordance with various embodiments of the present disclosure are provided. Each of the example gas detecting components 300A, 300B and 300C may be similar or identical to the gas detecting component 200 discussed above in connection with FIG. 2 (for example, as illustrated, each gas detecting component 300A, 300B, and 300C may comprise a light source, a beam compressor, a moveable mirror component, a first lens, a second lens, a focusing lens, a grating element, an optical component, and an observation plane).

As noted above, in various examples, by varying the position of a moveable mirror component within a gas detecting component/apparatus, a probe wavelength/gas absorption frequency range of the gas detecting component/apparatus can be modified to facilitate detection of more than one gaseous substance.

As depicted in FIG. 3A, the example gas detecting component 300A comprises at least a moveable mirror component 301A. The moveable mirror component 301A may comprise a MEMS mirror, microscanner, micro scanning mirror, or the like. In various examples, the moveable mirror component 301B is configured to facilitate selection/modification of a probe wavelength/gas absorption frequency range of the example gas detecting component 300A. In some embodiments, the moveable mirror component 301 is arranged/configured to move, rotate and/or tilt between an operational range (e.g., ±5 degrees, ±15 degrees, or the like) where each increment of the operational range is associated with a particular narrow band. In some embodiments, the operational range may define an extreme positive position (e.g., angle, tilt, and/or the like), a zeroth position and an extreme negative position. For example, as shown, the moveable mirror component 301A is in a first position (e.g., an extreme positive position) at a 40 degree angle and thus the gas detecting component 300A will output a light beam of a first probe wavelength (e.g., as depicted, onto an observation plane) associated in turn with a first gas absorption frequency range. In some examples, the extreme positive position of the moveable mirror component 301A may be associated with an initial wavelength of a spectral band.

Referring now to FIG. 3B, the example gas detecting component 300B comprises at least a moveable mirror component 301B (e.g., MEMS mirror, microscanner, micro scanning mirror, or the like). In various examples, the moveable mirror component 301B is configured to facilitate selection/modification of a probe wavelength/gas absorption frequency range of the example gas detecting component 300B. For example, as shown, the moveable mirror component 301B is in a second position (e.g., a zeroth position) at a 45 degree angle and thus the gas detecting component 300B will output a light beam of a second probe wavelength (e.g., as depicted, onto an observation plane) associated in turn with a second or mid gas absorption frequency range. In some examples, the zeroth position of the moveable mirror component 301B may be associated with a mid wavelength band.

Referring now to FIG. 3C, the example gas detecting component 300C comprises at least a moveable mirror component 301C (e.g., MEMS mirror, microscanner, micro scanning mirror, or the like). In various examples, the moveable mirror component 301C is configured to facilitate selection/modification of a probe wavelength of the example gas detecting component 300C. For example, as shown, the moveable mirror component 301C is in a third position (e.g., extreme negative position) at a 50 degree angle and thus the gas detecting component 300C will output a light beam of a third or final probe wavelength (e.g., as depicted, onto an observation plane) associated in turn with a third gas absorption frequency range. In some examples, the extreme negative position of the moveable mirror component 301C may be associated with a final wavelength band.

Accordingly, FIG. 3A, FIG. 3B and FIG. 3C demonstrate that a moveable mirror component can facilitate sequential transition wavelengths for multi-gas detection (e.g., as shown, a first target gaseous substance, a second target gaseous substance, and a third target gaseous substance) and quantification operations.

Figure 4:
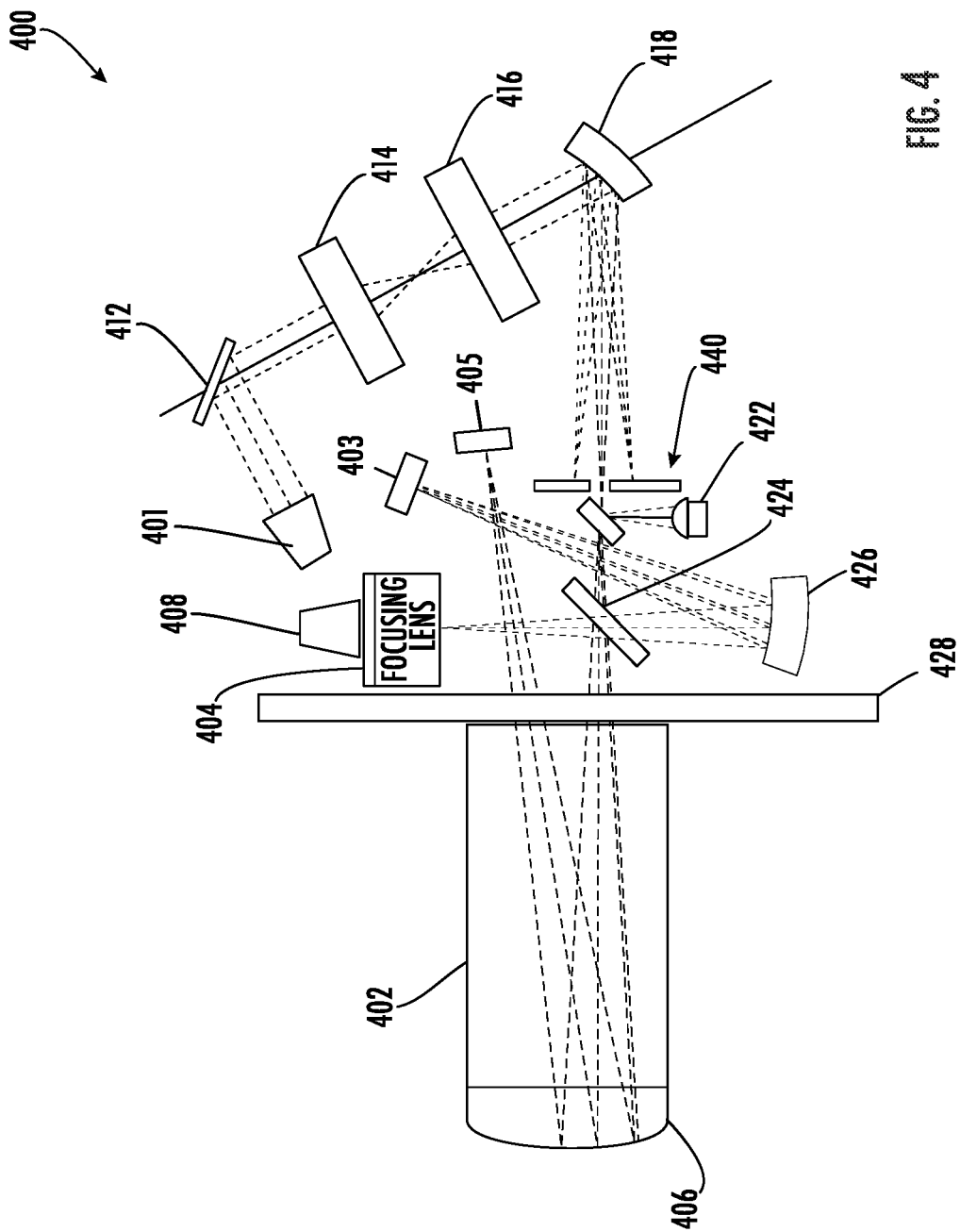
FIG. 4 illustrates an example schematic diagram depicting a gas detecting apparatus in accordance with various embodiments of the present disclosure.

Referring now to FIG. 4, a schematic diagram depicting an example gas detecting apparatus 400 in accordance with various embodiments of the present disclosure is provided. As illustrated, the example gas detecting apparatus 400 comprises a light source 401, a gas cell 402, a reference detecting element 403, a sample detecting element 405, a first optical component 404, a second optical component 426, a third optical component 406, a moveable mirror component 412, a first lens 414, a second lens 416, a grating element 418, a wavelength selection aperture 440, a calibration detector 422, a beam splitter 424, and a window 428. In various embodiments, the gas detecting component 400 may be configured to condition a light beam at a selected (e.g., probe) wavelength and direct the conditioned light beam to a detecting element in order to provide measurements associated with one or more target gaseous substances.

As noted above, the example gas detecting component 400 comprises a light source 401 (e.g., laser diode, LED, or the like) that is configured to emit a light beam (e.g., infrared light) through an aperture (e.g., slit) on a surface of the gas detecting apparatus 400. In various embodiments, the light source 401 may be configured to produce, generate, emit, and/or trigger the production, generation, and/or emission of light beams.

As further depicted in FIG. 4, the light beam generated and/or emitted by the light source 401 may travel along at least a portion of a path (e.g., channel) of the example gas detecting component 400 to reach a moveable mirror component 412 (e.g., MEMS mirror). As shown, the moveable mirror component 412 is located downstream with respect to light source 401. The moveable mirror component 412 can be positioned/configured to facilitate modification of a probe wavelength of the example gas detecting apparatus based at least in part on a position of the moveable mirror component 412. As shown, the moveable mirror component 412 is positioned to direct the light beam generated and/or emitted by light source 401 at a particular angle of incidence as it travels along at least a portion of the path (e.g., channel) within the example gas detecting apparatus 400.

As illustrated in FIG. 4, the moveable mirror component 412 is configured to direct the light beam to be incident on the first lens 414 and the second lens 416. As depicted, the first lens 414 and the second lens 416 are downstream with respect to the moveable mirror component 412. Each of the first lens 414 and the second lens 416 may comprise transmissive optical devices (e.g., for example optical lenses or prisms). In some embodiments, the first lens 414 may comprise a telecentric lens and the second lens 416 may comprise a reverse telecentric lens. In various embodiments, the first lens 414 and the second lens 416 may serve to further condition (e.g., collimate), focus, and/or concentrate a light beam directed by the moveable mirror component 412 as it travels along at least a portion of the path (e.g., channel) within the example gas detecting apparatus 400.

As shown in FIG. 4, in various examples, the first lens 414 and the second lens 416 are positioned/configured to direct the light beam to be incident on a grating element 418. As depicted, the grating element 418 is downstream with respect to the first lens 414 and the second lens 416. The example grating element 418 may comprise a concave reflective grating or diffraction grating element that operates to diffract the collimated light beam into a plurality of beams each traveling at different angles. In various embodiments, the diffraction angles of the plurality of beams may be dependent on the incident angle of light to the grating element 418 (e.g., outputted by the first lens 414 and the second lens 416). In various embodiments, the grating element 418 may condition (e.g., diffract) a collimated light beam directed by first lens 414 and the second lens 416 as it travels along at least a portion of the path (e.g., channel) of the example gas detecting apparatus 400.

As further depicted in FIG. 4, the grating element 418 is configured to direct the light beam through a wavelength selection aperture 440. As depicted, wavelength selection aperture 440 is downstream with respect to the grating element 418. In various embodiments, the wavelength selection aperture 440 facilitates further selection of a particular wavelength of the diffracted light beam provided by the grating element 418. As further depicted, the light beam entering the wavelength selection aperture 440 is directed through a window 428 of the gas detecting apparatus 400 that separates a gas cell 402 from the other components of the gas detecting apparatus 400. In various embodiments, the gas cell 402 is configured to receive/contain sample gaseous substances (e.g., chemical composition(s), molecules, and/or the like). As illustrated, the gas cell 402 comprises a second optical component 426 configured to reflect/direct at least a portion of a light beam (e.g., provided by the beam splitter 424) to a sample detecting element 405 that operates to generate measurements indicative of a concentration level of the sample gaseous substance disposed within the gas cell. Accordingly, the input light beam received via the wavelength selection aperture 440 may provide a light beam of a selected wavelength for use in quantifying a target gaseous substance disposed within the gas cell 402. As noted above, an example gaseous substance may absorb a light beam's radiant energy and generate a measurable attenuated optical signal indicative of a concentration level/amount of molecules, chemical composition(s), and/or the like in the absorbing gaseous substance.

As illustrated in FIG. 4, subsequent to passing through the wavelength selection aperture 440, the light beam is incident on a beam splitter 424. In some examples, the beam splitter 424 may comprise one or more optical elements that may be configured to divide, split, and/or separate the light beam into two or more divisions, portions, and/or beams. For example, the beam splitter 424 may comprise a plater beam splitter or glass plate or cube. One or more surfaces of the beam splitter 424 may be coated with one or more chemical coatings. For example, the glass plate may be coated with a chemical coating such that at least a portion of the light may be reflected from the glass plate and at least another portion of the light may be transmitted through the glass plate. In some examples, the plater beam splitter may be positioned at an angle with respect to the angle of an input light beam.

In the example shown in FIG. 4, the beam splitter 424 may split the light beam received from a reference light source 408 into at least two portions. For example, a first portion of the light beam may be reflected from the beam splitter 424 may pass through the beam splitter 424 and arrive at the second optical component 426 (e.g., concave mirror) to provide a reference signal that is detected by a reference detecting element 403. As further depicted in FIG. 4, the reference light source 408 is positioned adjacent the first optical component 404 (e.g., comprising a focusing lens and/or a reference wavelength narrow band filter). The measurements obtained via the reference detecting element 403 may be utilized to verify accuracy of measurements obtained via the sample detecting element 405.

As further depicted in FIG. 4, the gas detecting apparatus 400 comprises at least one calibration detector 422 for real-time monitoring of optical engine performance and manual/automated real-time calibration. In some examples, the calibration detector 422 may be or comprise a notch filter that operates to filter a particular wavelength/frequency of light (e.g., a wavelength/frequency that may be associated with a gaseous substance/chemical composition/molecules) in order to verify operational parameters of one or more components of the gas detecting apparatus 400, as discussed further in relation to FIG. 6. In various embodiments, as shown, the calibration detector 422 is at least partially positioned between the wavelength selection aperture 440 and the beam splitter 424 in order to filter a particular wavelength from the input light beam received via the wavelength selection aperture 440. In some embodiments, the reference beam of the reference light source 408 and the conditioned light beam emerging from the light source 401 and traveling through the gas detecting component 400 into the gas cell 402 may be identical to one another (e.g., having the same dimensions and/or angle of divergence) so that the reference beam and conditioned light beam overlap with one another with a very tight tolerance in order to avoid drift in the signal due to obstruction caused by molecule interactions in the path/channel. For example, due to the overlapping of the reference beam and conditioned light beam, any obstructing particles will affect the reference beam and the conditioned light beam in a similar fashion (e.g., at the same location/point) thereby facilitating detection of the obstructing particles.

While FIG. 4 provides an example of a gas detecting apparatus 400, it is noted that the scope of the present disclosure is not limited to the example shown in FIG. 4. In some examples, an example gas detecting apparatus 400 may comprise one or more additional and/or alternative elements, and/or may be structured/positioned differently than those illustrated in FIG. 4.

Figure 5:
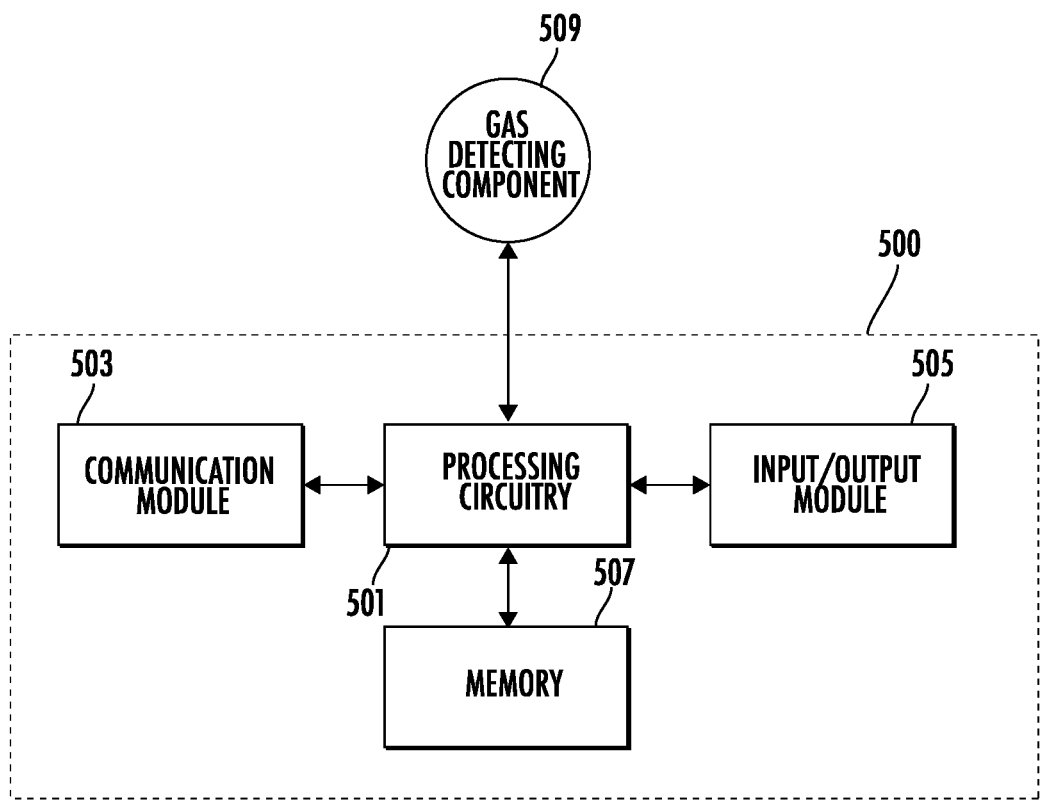
FIG. 5 illustrates an example controller component in electronic communication with various other components of an example apparatus in accordance with various embodiments of the present disclosure.

Referring now to FIG. 5, a schematic diagram depicting an example controller component 500 of an example apparatus in electronic communication with various other components in accordance with various embodiments of the present disclosure. As shown, the controller component 500 comprises processing circuitry 501, a communication module 503, input/output module 505, a memory 507 and/or other components configured to perform various operations, procedures, functions or the like described herein.

As shown, the controller component 500 (such as the processing circuitry 501, communication module 503, input/output module 505 and memory 507) is electrically coupled to and/or in electronic communication with a gas detecting component 509 (e.g., a multi-gas detecting monochromator). As depicted, the gas detecting component 509 may exchange (e.g., transmit and receive) data with the processing circuitry 501 of the controller component 500.

The processing circuitry 501 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 501 may comprise one or more processors. In one exemplary embodiment, the processing circuitry 501 is configured to execute instructions stored in the memory 507 or otherwise accessible by the processing circuitry 501. When executed by the processing circuitry 501, these instructions may enable the controller component 500 to execute one or a plurality of the functions as described herein. No matter whether it is configured by hardware, firmware/software methods, or a combination thereof, the processing circuitry 501 may comprise entities capable of executing operations according to the embodiments of the present invention when correspondingly configured. Therefore, for example, when the processing circuitry 501 is implemented as an ASIC, an FPGA, or the like, the processing circuitry 501 may comprise specially configured hardware for implementing one or a plurality of operations described herein. Alternatively, as another example, when the processing circuitry 501 is implemented as an actuator of instructions (such as those that may be stored in the memory 507), the instructions may specifically configure the processing circuitry 501 to execute one or a plurality of algorithms and operations described herein, such as those discussed with reference to FIG. 5.

The memory 507 may comprise, for example, a volatile memory, a non-volatile memory, or a certain combination thereof. Although illustrated as a single memory in FIG. 5, the memory 507 may comprise a plurality of memory components. In various embodiments, the memory 507 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 507 may be configured to store information, data, application programs, instructions, and etc., so that the controller component 500 can execute various functions according to the embodiments of the present disclosure. For example, in at least some embodiments, the memory 507 is configured to cache input data for processing by the processing circuitry 501. Additionally or alternatively, in at least some embodiments, the memory 507 is configured to store program instructions for execution by the processing circuitry 501. The memory 507 may store information in the form of static and/or dynamic information. When the functions are executed, the stored information may be stored and/or used by the controller component 500.

The communication module 503 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 507) and executed by a controller component 500 (for example, the processing circuitry 501). In some embodiments, the communication module 503 (as with other components discussed herein) may be at least partially implemented as the processing circuitry 501 or otherwise controlled by the processing circuitry 501. In this regard, the communication module 503 may communicate with the processing circuitry 501, for example, through a bus. The communication module 503 may comprise, for example, antennas, transmitters, receivers, transceivers, network interface cards and/or supporting hardware and/or firmware/software, and is used for establishing communication with another apparatus. The communication module 503 may be configured to receive and/or transmit any data that may be stored by the memory 507 by using any protocol that can be used for communication between apparatuses. The communication module 503 may additionally or alternatively communicate with the memory 507, the input/output module 505 and/or any other component of the controller component 500, for example, through a bus.

In some embodiments, the controller component 500 may comprise an input/output module 505. The input/output module 505 may communicate with the processing circuitry 501 to receive instructions input by the user and/or to provide audible, visual, mechanical or other outputs to the user. Therefore, the input/output module 505 may comprise supporting devices, such as a keyboard, a mouse, a display, a touch screen display, and/or other input/output mechanisms. Alternatively, at least some aspects of the input/output module 505 may be implemented on a device used by the user to communicate with the controller component 500. The input/output module 505 may communicate with the memory 507, the communication module 503 and/or any other component, for example, through a bus. One or a plurality of input/output modules and/or other components may be included in the controller component 500.

For example, the gas detecting component 509 may be similar to gas detecting component 200 described above with regard to FIG. 2. For example, gas detecting component 509 may provide a measurable attenuated optical signal for generating a concentration level indication associated with one or more gaseous substances by the processing circuitry 501.

Figure 6:
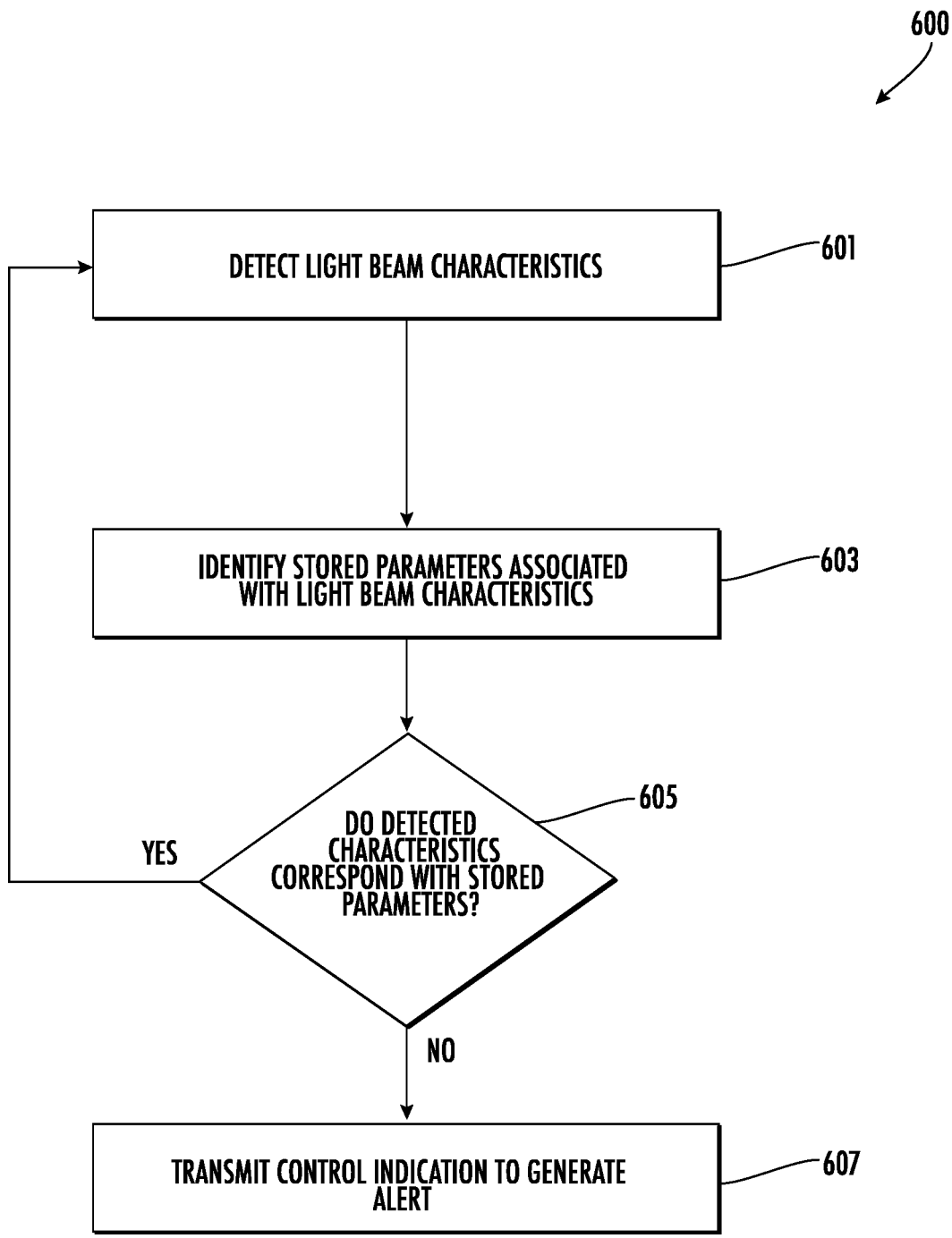
FIG. 6 is a flowchart diagram illustrating example operations in accordance with various embodiments of the present disclosure.

Referring now to FIG. 6, a flowchart diagram illustrating example operations 600 in accordance with various embodiments of the present disclosure is provided.

In some examples, the method 600 may be performed by a processing circuitry (for example, but not limited to, an application-specific integrated circuit (ASIC), a central processing unit (CPU)). In some examples, the processing circuitry may be electrically coupled to and/or in electronic communication with other circuitries of the example apparatus, such as, but not limited to, a calibration detector 422, a memory (such as, for example, random access memory (RAM) for storing computer program instructions), and/or a display circuitry (for rendering readings on a display).

In some examples, one or more of the procedures described in FIG. 6 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

As noted herein, certain conditions such as the presence of dust within an example gas detecting apparatus and/or drift may cause the example gas detecting apparatus to provide inaccurate measurements. For example, the presence of dust may cause less light to be incident at one or more locations within the example gas detecting apparatus and/or affect the absorption of a sample gaseous substance.

The example method 600 begins at step/operation 601. At step/operation 601, a processing circuitry (such as, but not limited to, the processing circuitry 501 of the controller component 500 illustrated in connection with FIG. 5, discussed above) receives an indication describing light beam characteristics (e.g., via calibration detector 422 discussed above in connection with FIG. 4). For example, the processing circuitry 501 may receive an indication associated with a light beam/gas absorbance frequency range or value detected by the example calibration detector. Additionally, light beam characteristics may include one or more characteristics associated with at least one component of the example gas detecting apparatus (e.g., moveable mirror component). For instance, in addition to identifying the gas absorbance frequency range or value, processing circuitry may also identify a current position, angle and/or power associated with a moveable mirror component.

Subsequent to step/operation 601, the example method 600 proceeds to step/operation 603. At step/operation 603, the processing circuitry identifies stored parameters associated with the light beam characteristics. In some embodiments, the stored parameters may be associated with a moveable mirror component (such as, but not limited to, moveable mirror component 412 discussed above in connection with FIG. 4). In some examples, the processing circuitry may utilize a lookup table, such as the following lookup table, to identify stored parameters associated with a detected light beam.

TABLE 1

| Lookup table for identifying stored parameters associated with light beam characteristics | | |
| --- | --- | --- |
| Detected gas absorbance frequency value | Moveable mirror component angle | Power |
| 2000 nanometers (nm) | 45 degrees | 5 Volts (V) |
| 2500 nm | 42.5 degrees | 5.2 V |

Accordingly, in an instance in which the detected gas absorbance frequency value is 450 nm, the processing circuitry may determine that the angle of the moveable mirror component should be 45 degrees and a power source should be 5 V.

Subsequent to step/operation 603, the method 600 proceeds to step/operation 605. At step/operation 605, processing circuitry determines whether the detected characteristics correspond with the stored parameters. For example, with reference to Table 1 above, in an instance in which the light beam characteristics are 2000 nm, 45 degrees and 5 V, the processing circuitry may determine that the detected light beam characteristics correspond with the stored parameters thus indicating that the operational parameters of the moveable mirror component are correct. In such examples, the method 600 may return to step/operation 601 where the processing circuitry continues to monitor/detect light beam characteristics (e.g., via the example calibration detector).

In another example, in an instance in which the light beam characteristics are 2500 nm, 50 degrees and 6 V, the processing circuitry may determine that the detected light beam characteristics do not correspond with the stored parameters thus indicating that the operational parameters of the moveable mirror component are incorrect. In such examples, the method 600 proceeds to step/operation 607 and the processing circuitry transmits a control indication to generate an alert (e.g., via a display of the example gas detecting apparatus) indicating that the moveable mirror component is malfunctioning. Using the techniques discussed above, a user of an example gas detecting apparatus may be notified with respect to issues including drift, the presence of dust and/or the like which may affect operations of the gas detecting apparatus.

Figure 7:
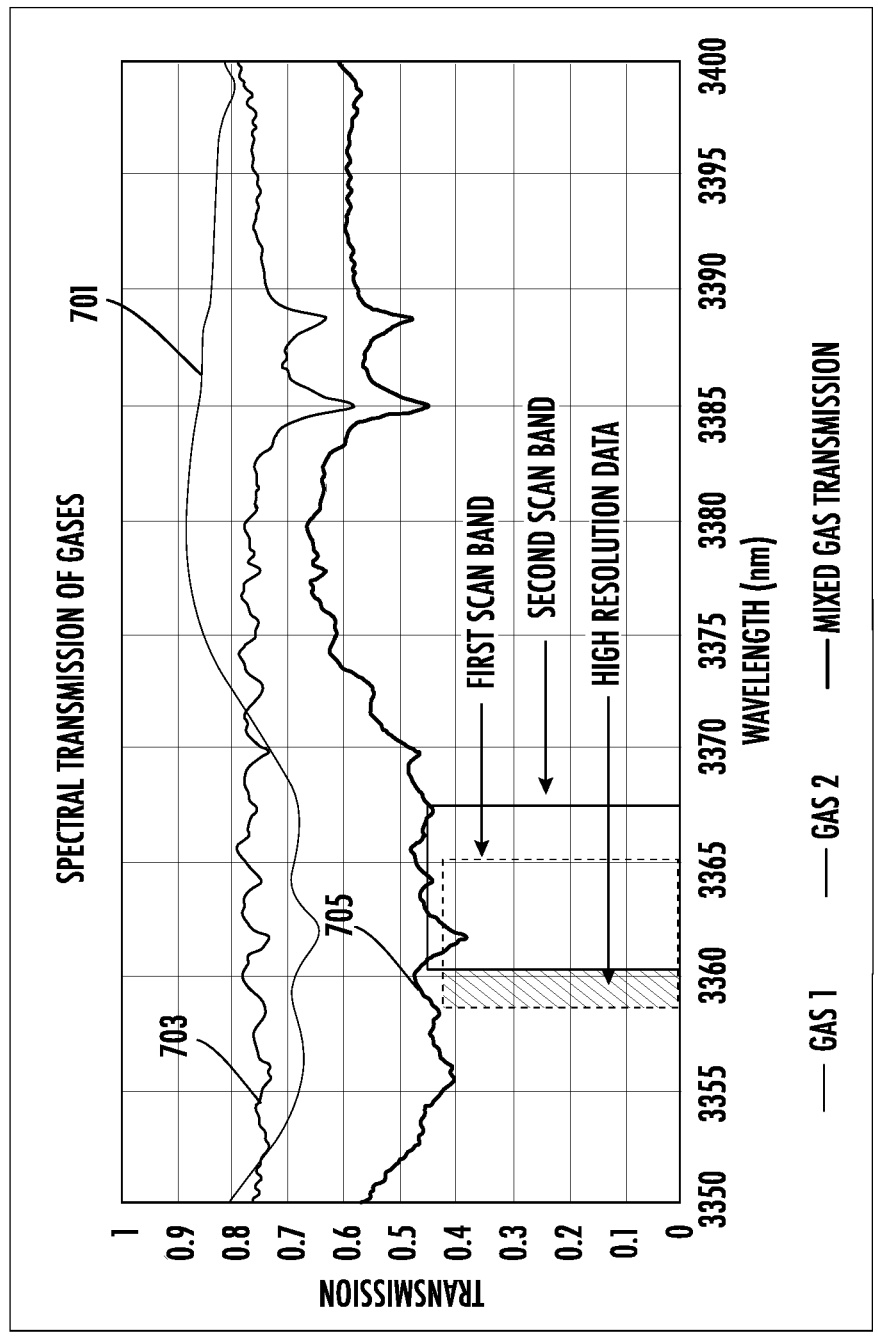
FIG. 7 illustrates a graph depicting example measurements in accordance with various embodiments of the present disclosure.

Referring now to FIG. 7, a graph 700 depicting example measurements associated with an example gas detecting apparatus in accordance with various embodiments of the present disclosure is provided. As depicted in FIG. 7. the x-axis represents wavelength values (measured in nm) associated with a sample gaseous substance. As depicted, the y-axis represents measurements associated with a normalized value of spectral transmission of corresponding wavelengths after absorption by a sample gaseous substance (associated with a concentration level).

As illustrated in FIG. 7, in order to quantify/measure a first gaseous substance, the example gas detecting apparatus utilizes a first scan band (as depicted, with a narrow band between 3360 and 3365 nm) illustrated as a first line 701 of the graph 700. Then, as further depicted, in order to quantify/ measure the second gaseous substance, the example gas detecting apparatus utilizes a second scan band (as depicted, with a narrow band between 3360 and 3367 nm) illustrated as a second line 703 of the graph 700. In some examples, as illustrated, the example gas detecting apparatus may identify data associated with a particular wavelength by determining a variance between two particular scan bands (e.g., the first scan band and the second scan band). Accordingly, in some embodiments, an example gas detecting apparatus may generate data (e.g., a graph, plot, or the like) associated with a plurality of gaseous substances. For example, as depicted in FIG. 7, the example gas detecting component may generate an output illustrated as a third line 705 of the graph 700 describing mixed gas transmission data (i.e., comprising information associated with both the first gaseous substance depicted in the first line 701 and the second gaseous substance depicted in the second line 703). Additionally, the example gas detecting apparatus may identify one or more gaseous substances based at least in part on identified features/characteristics (e.g., a transmission signature associated with particular gaseous substances) from the mixed gas transmission data. In some embodiments, an example gas detecting apparatus (such as, but not limited to, gas detecting component 509/controller component 500 described above in connection with FIG. 5) may utilize a trained machine learning model/algorithm that is configured to determine a concentration level associated with one or more gaseous substances. The example machine learning model/algorithm may be a data object that describes steps/ operations, hyper-parameters, and/or parameters of a machine learning model/algorithm that is configured to analyze data (e.g., an mixed gas transmission data as illustrated by the third line 705 of the graph) in order to generate an inference with respect to one or more gaseous substances. The example machine learning model may be trained based at least in part on a ground truth data associated with a plurality of gaseous substances (e.g., ground truth data describing stored data/plots associated with a plurality of gaseous substances including various chemical compositions and molecules). In some embodiments, the machine learning model/algorithm may be or comprise a neural network, a convolutional neural network (CNN), a recurrent neural network (RNN), and/or the like.

Accordingly, FIG. 7 demonstrates that by varying a position of a moveable mirror component, a gas detecting apparatus may identify/quantify a plurality of gaseous substances within a sample gaseous substance.

As noted herein, and as discussed above with respect to FIG. 7, an example gas detecting apparatus may be configured to obtain measurements associated with a sample gaseous substance and/or chemical composition.

Figure 8:
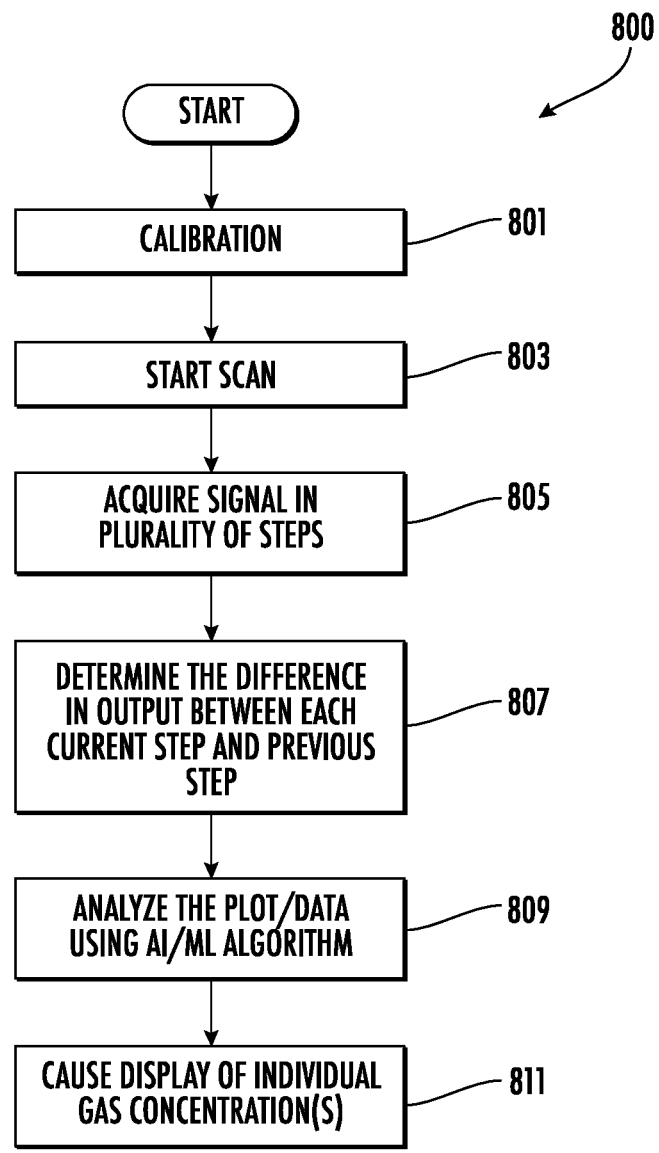
FIG. 8 is a flowchart diagram illustrating example operations in accordance with various embodiments of the present disclosure.

Referring now to FIG. 8, a flowchart diagram illustrating example operations 800 in accordance with various embodiments of the present disclosure is provided.

The example method 800 begins at step/operation 801. At step/operation 801, a processing circuitry (such as, but not limited to, the processing circuitry 501 of the controller component 500 illustrated in connection with FIG. 5, discussed above) performs calibration operations. In some examples, the calibration operations may include steps/ operations performed in conjunction with a calibration detector (such as, but not limited to, calibration detector 422 discussed above in connection with FIG. 4).

Subsequent to step/operation 801, the method 800 proceeds to step/operation 803. At step/operation 803, processing circuitry starts scanning operations. In some examples, the scanning operations comprises obtaining data associated with a plurality of different positions of a moveable mirror component (such as, but not limited to, moveable mirror component 206 discussed above in connection with FIG. 2).

Subsequent to step/operation 803, the method 800 proceeds to step/operation 805. At step/operation 805, processing circuitry acquires signal(s) in each of a plurality of steps, in which each step corresponds with a particular position of the moveable mirror component. In some examples, each step difference may be less than a bandwidth of a narrow probe wavelength. By way of example, as depicted in FIG. 7, processing circuitry may obtain a first signal utilizing a first scan band (e.g., between 3360 and 3365 nm). Subsequent to obtaining the first signal utilizing the first scan band, processing circuitry may obtain a second signal utilizing a second scan band (e.g., between 3360 and 3367 nm).

Subsequent to step/operation 805, the method 800 proceeds to step/operation 807. At step/operation 807, processing circuitry determines the difference in output between each current step and previous step in which, as noted above, each step may be associated with a particular scan band. Accordingly, as depicted in FIG. 7, processing circuitry may determine the difference in output between the output of the first scan band and the output of the second scan band in order to generate/obtain high resolution data for a target region/area of a tunable filter scanning range. In some embodiments, processing circuitry may generate a plot/graph describing data obtained in a plurality of steps (e.g., mixed gas transmission data as depicted by the third line 705 of FIG. 7 described above).

Subsequent to step/operation 807, The method 800 proceeds to step/operation 809. At step/operation 809, processing circuitry analyzes the data (e.g., plot/graph) using an artificial intelligence (AI)-based technique or machine learning model/algorithm. For example, processing circuitry may analyze the data using a machine learning model that is configured to determine a concentration level associated with a plurality of gaseous substances by identifying patterns, trends, and/or features in an output plot of a graph depicting mixed gas transmission data. By way of example, with reference to FIG. 7, processing circuitry may determine that a first transmission signal change at 3385 nm and a second transmission signal change at 3388 nm in mixed gas transmission data (depicted in the third line 705 of the graph) are indicative of a presence/concentration of a second gaseous substance. In other words, processing circuitry determines that the second line 703 of the graph and the third line 705 of the graph 700 have one or more features in common.

Subsequent to step/operation 809, the method 800 proceeds to step/operation 811. At step/operation 811, processing circuitry causes display of an indication of the determined individual gas concentration(s), such as via display circuitry.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A gas detecting apparatus comprising:
   a light source configured to generate a light beam;
   a moveable mirror component configured to move between a plurality of positions, wherein each position of the moveable mirror component is associated with a narrow band corresponding with a gas absorption frequency range of a target gaseous substance or chemical composition;
   at least one optical component configured to condition an output light beam of the moveable mirror component, wherein a measurable attenuated optical signal is generated responsive to exposing a sample gaseous substance to the conditioned output light beam; and
   a reference light source configured to generate a reference beam, wherein the reference beam and the conditioned output light beam are substantially identical in dimensions or in angle of divergence, wherein the reference beam and the conditioned output light beam are overlapped with a tight tolerance to minimize drift in the measurable attenuated optical signal due to obstruction caused by molecule interactions in a beam path; and
   a controller component in electronic communication with the moveable mirror component and the at least one optical component, the controller component configured to:
      acquire a plurality of signals in a plurality of steps, wherein each of the plurality of steps corresponds to a particular position of the plurality of positions of the moveable mirror component and a particular scan band;
      obtain high-resolution data of a region of a target scan band based on outputs of each of the plurality of steps; and
      analyze the high-resolution data using a machine learning model to determine a concentration level of the target gaseous substance or the chemical composition.

2. The gas detecting apparatus of claim 1, wherein the controller component is configured to generate a concentration level indication for the target gaseous substance or the chemical composition.

3. The gas detecting apparatus of claim 1, wherein the moveable mirror component comprises a microelectromechanical (MEMS) mirror, microscanner or high-speed rotating mirror component driven by an electrostatic, piezoelectric or electromagnetic actuator.

4. The gas detecting apparatus of claim 1, wherein the at least one optical component comprises one or more of telecentric lenses, a beam splitter, and a grating element.

5. The gas detecting apparatus of claim 1, further comprising at least one calibration detector that is configured to selectively filter a particular wavelength of the conditioned output light beam.

6. The gas detecting apparatus of claim 5, wherein the controller component is further configured to:
   identify one or more light beam characteristics associated with the selectively filtered wavelength;
   identify stored parameters associated with the one or more light beam characteristics; and
   determine whether the one or more light beam characteristics correspond with the stored parameters.

7. The gas detecting apparatus of claim 6, wherein the controller component is further configured to:
in response to determining that the one or more light beam characteristics do not correspond with the stored parameters, transmit a control indication to generate an alert.

8. The gas detecting apparatus of claim 7, wherein the stored parameters comprise a moveable mirror component angle and power.

9. The gas detecting apparatus of claim 1, wherein the machine learning model comprises at least one of a neural network, a convolutional neural network or a recurrent neural network.

10. The gas detecting apparatus of claim 1, wherein the at least one optical component comprises telecentric lenses that is configured to modify an angle of incidence of the light beam.

11. A method comprising:
generating, by a light source of a detecting apparatus, a light beam;
conditioning, by at least one optical component, an output light beam of a moveable mirror component of the detecting apparatus,
wherein:
the moveable mirror component is configured to move between a plurality of positions,
each position of the moveable mirror component is associated with a narrow band corresponding with a gas absorption frequency range of a target gaseous substance or chemical composition, and
a measurable attenuated optical signal is generated responsive to exposing a sample gaseous substance to the conditioned output light beam;
generating, by a reference light source, a reference beam, wherein the reference beam and the conditioned output light beam are substantially identical in dimensions or in angle of divergence, wherein the reference beam and the conditioned output light beam are overlapped with a tight tolerance to minimize drift in the measurable attenuated optical signal due to obstruction caused by molecule interactions in a beam path;
acquiring, by a controller component in electronic communication with the moveable mirror component and the at least one optical component, a plurality of signals in a plurality of steps, wherein each of the plurality of steps corresponds to a particular position of the plurality of positions of the moveable mirror component and a particular scan band;
obtaining, by the controller component, high-resolution data of a region of a target scan band based on outputs of each of the plurality of steps; and
analyzing, by the controller component, the high-resolution data using a machine learning model to determine a concentration level of the target gaseous substance or the chemical composition.

12. The method of claim 11, further comprising:
generating, by the controller component, a concentration level indication for the target gaseous substance or the chemical composition.

13. The method of claim 11, wherein the moveable mirror component comprises a MEMS mirror, microscanner or high-speed rotating mirror component driven by an electrostatic, piezoelectric or electromagnetic actuator.

14. The method of claim 11, wherein the at least one optical component comprises one or more of telecentric lenses, a beam splitter, and a grating element.

15. The method of claim 11, further comprising:
selectively filtering, by at least one calibration detector of the detecting apparatus, a particular wavelength of the conditioned output light beam.

16. The method of claim 15, further comprising:
identifying, by the controller component, one or more light beam characteristics associated with the selectively filtered wavelength;
identifying, by the controller component, stored parameters associated with the one or more light beam characteristics; and
determining, by the controller component, whether the one or more light beam characteristics correspond with the stored parameters.

17. The method of claim 16, further comprising:
in response to determining, by the controller component, that the one or more light beam characteristics do not correspond with the stored parameters,
transmitting, by the controller component, a control indication to generate an alert.

18. The method of claim 17, wherein the stored parameters comprise a moveable mirror component angle and power.

19. The method of claim 11, wherein the machine learning model comprises at least one of a neural network, a convolutional neural network or a recurrent neural network.

20. The method of claim 11 wherein the at least one optical component comprises telecentric lenses that are configured to modify an angle of incidence of the light beam.

* * * * *